(12) United States Patent
Ikedo (10) Patent No.: US 9,596,424 B2
(45) Date of Patent: Mar. 14, 2017

(54) IMAGE CAPTURING APPARATUS AND METHOD OF CONTROLLING THE SAME

(71) Applicant: CANON KABUSHIKI KAISHA, Tokyo (JP)

(72) Inventor: Hideki Ikedo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/220,722

(22) Filed: Mar. 20, 2014

(65) Prior Publication Data

US 2014/0320735 A1   Oct. 30, 2014

(30) Foreign Application Priority Data

Apr. 25, 2013  (JP) ................................. 2013-093051

(51) Int. Cl.
| | | |
|---|---|---|
| *H04N 5/335* | (2011.01) | |
| *H04N 5/378* | (2011.01) | |
| *H04N 5/232* | (2006.01) | |
| *H04N 5/369* | (2011.01) | |

(52) U.S. Cl.
CPC ......... *H04N 5/378* (2013.01); *H04N 5/23212* (2013.01); *H04N 5/3696* (2013.01)

(58) Field of Classification Search
None
See application file for complete search history.

(56) References Cited

U.S. PATENT DOCUMENTS

| | | | | |
|---|---|---|---|---|
| 6,693,670 | B1* | 2/2004 | Stark | .............................. 348/308 |
| 6,850,278 | B1* | 2/2005 | Sakurai | .............. H04N 5/35563 |
| | | | | 250/208.1 |
| 6,933,978 | B1* | 8/2005 | Suda | ............................. 348/345 |
| 2006/0044439 | A1* | 3/2006 | Hiyama | ............ H01L 27/14603 |
| | | | | 348/308 |
| 2011/0096200 | A1* | 4/2011 | Shibuno | ................. G03B 13/36 |
| | | | | 348/231.99 |

(Continued)

FOREIGN PATENT DOCUMENTS

| | | |
|---|---|---|
| CN | 101097288 A | 1/2008 |
| CN | 101779154 A | 7/2010 |

(Continued)

OTHER PUBLICATIONS

The above foreign patent documents were cited in a Jan. 4, 2017 Chinese Office Action, which is unclosed with an English Translation, that issued in Chinese Patent Application No. 201410168545.3.

*Primary Examiner* — Twyler Haskins
*Assistant Examiner* — Wesley Chiu
(74) *Attorney, Agent, or Firm* — Cowan, Liebowitz & Latman, P.C.

(57) ABSTRACT

An image capturing apparatus comprising an image sensor including a plurality of pixels each including a plurality of photoelectric conversion units, and a first holding unit and a second holding unit configured to store signals output from the plurality of pixels and a driving unit configured to perform first write processing for writing first signals supplied from a first number of photoelectric conversion elements of each pixel in the first holding unit and second write processing for writing second signals supplied from a second number of photoelectric conversion units of each pixel.

30 Claims, 5 Drawing Sheets

(56) References Cited

U.S. PATENT DOCUMENTS

| | | | |
|---|---|---|---|
| 2013/0229543 A1* | 9/2013 | Hashimoto | H04N 5/35545 348/222.1 |
| 2013/0229555 A1* | 9/2013 | Hashimoto | H04N 5/3696 348/300 |
| 2013/0229557 A1* | 9/2013 | Hashimoto et al. | 348/301 |
| 2013/0293763 A1* | 11/2013 | Shoda et al. | 348/345 |
| 2014/0063329 A1* | 3/2014 | Masuyama | H04N 5/23241 348/349 |
| 2014/0118587 A1* | 5/2014 | Ikedo | H04N 5/23212 348/281 |
| 2014/0146196 A1* | 5/2014 | Shoda et al. | 348/222.1 |
| 2014/0192249 A1* | 7/2014 | Kishi | 348/349 |
| 2014/0285707 A1* | 9/2014 | Ogawa | 348/353 |
| 2014/0307134 A1* | 10/2014 | Kanda | H04N 5/23212 348/280 |
| 2014/0368696 A1* | 12/2014 | Uchida | 348/234 |
| 2015/0062102 A1* | 3/2015 | Ikeda | H04N 5/347 345/207 |
| 2015/0062394 A1* | 3/2015 | Ikeda | H04N 5/347 348/301 |
| 2015/0189249 A1* | 7/2015 | Hiyama | H04N 9/045 348/281 |
| 2015/0215555 A1* | 7/2015 | Iwane | H04N 5/378 348/301 |
| 2015/0304586 A1* | 10/2015 | Kishi | H04N 5/378 348/302 |
| 2015/0312485 A1* | 10/2015 | Kitani | H04N 5/243 348/221.1 |

FOREIGN PATENT DOCUMENTS

| | | |
|---|---|---|
| CN | 102472881 A | 5/2012 |
| CN | 103002217 A | 3/2013 |
| JP | 2001-124984 A | 5/2001 |

* cited by examiner

IMAGE CAPTURING APPARATUS AND METHOD OF CONTROLLING THE SAME

BACKGROUND OF THE INVENTION

Field of the Invention

The present invention relates to an image capturing apparatus and a method of controlling the same.

Description of the Related Art

Image sensors used in image capturing apparatuses such as digital still cameras or digital video cameras are highly multi-functionalized. For example, some image sensors are known as sensors each having a focus detection function. Japanese Patent Laid-Open No. 2001-124984 discloses a technique for allowing focus detection of a phase difference detection method using output signals from two photodiodes which are arranged together with one microlens in one pixel of the image sensor and receive light beams passing through different pupil areas of an imaging lens. When the output signals from the two photodiodes in a single pixel are added, an image output can be obtained. With this arrangement, the signals must be obtained from the two photodiodes for each pixel. As compared with a conventional arrangement in which one photodiode is arranged for one pixel, the readout time is undesirably doubled. However, the readout time needs to be shortened to achieve readout operation at a predetermined frame rate.

The present invention provides an image capturing apparatus capable of shortening the signal readout time in the image capturing apparatus using an image sensor capable of performing focus detection of a phase difference detection method in consideration of the above problem.

SUMMARY OF THE INVENTION

The first aspect of the present invention provides an image capturing apparatus comprising an image sensor including a plurality of pixels each including a plurality of photoelectric conversion units, and a first holding unit and a second holding unit configured to store signals output from the plurality of pixels and a driving unit configured to perform first write processing for writing first signals supplied from a first number of photoelectric conversion elements of each pixel in the first holding unit and second write processing for writing second signals supplied from a second number of photoelectric conversion units of each pixel. The second number is larger than the first number, and driving the image sensor so as to set a period of the first write processing shorter than a period of the second write processing.

The second aspect of the present invention provides a method of controlling an image capturing apparatus including an image sensor including a plurality of pixels each including a plurality of photoelectric conversion units, and a first holding unit and a second holding unit configured to store signals output from the plurality of pixels. The method comprises a first write processing step of writing first signals supplied from a first number of photoelectric conversion elements of each pixel in the first holding unit and a second write processing step of writing second signals supplied from a second number of photoelectric conversion units of each pixel. The second number being larger than the first number and a period of the first write processing step is set shorter than a period of the second write processing step.

Further features of the present invention will become apparent from the following description of exemplary embodiments (with reference to the attached drawings).

DESCRIPTION OF THE EMBODIMENTS

An exemplary embodiment of the present invention will be described with reference to the accompanying drawings.

First Embodiment

Figure 1:
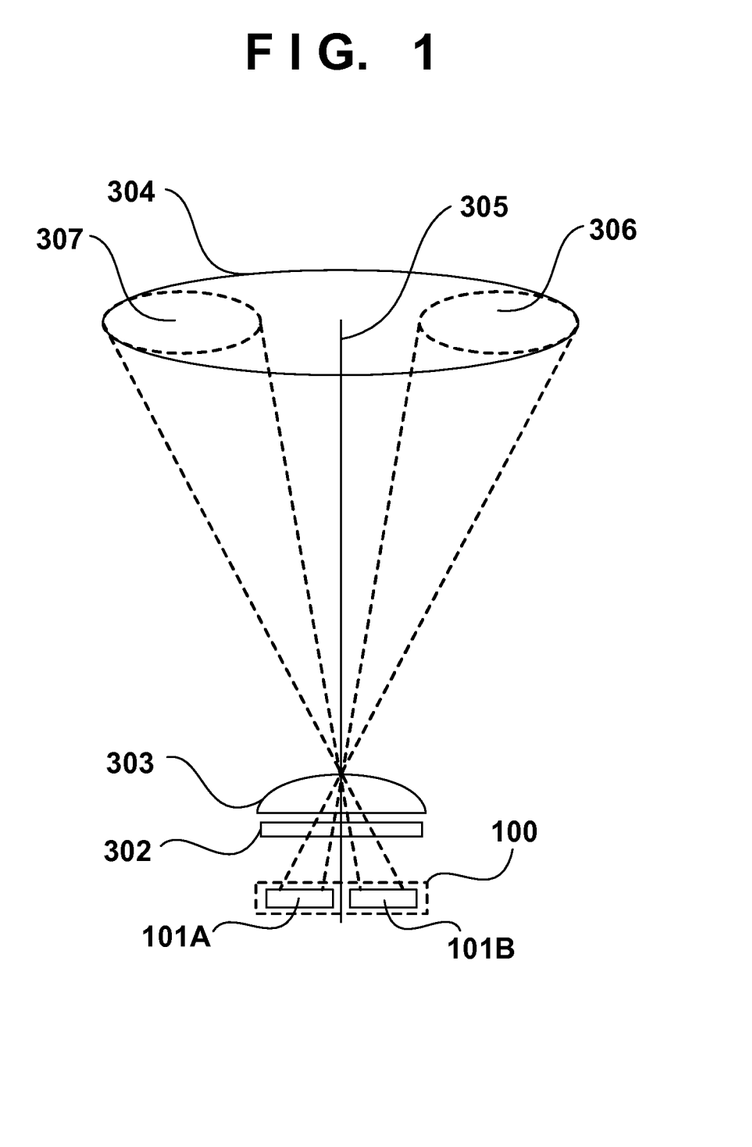
FIG. 1 is a conceptual view in which a light beam exiting from the exit pupil of a imaging lens of an image capturing apparatus is incident on a unit pixel.

The principle of implementing focus detection of a phase difference detection method in a general image sensor for capturing an object will be described first. FIG. 1 is a schematic view showing a state in which a light beam exiting from the exit pupil of an imaging lens is incident on one unit pixel of the image sensor. A unit pixel 100 includes a first photodiode 101A and a second photodiode 101B. A color filter 302 and a microlens 303 are arranged in correspondence with the unit pixel 100.

The center of a light beam exiting from the exit pupil 304 of the imaging lens is defined as an optical axis 305 with respect to the pixel having the microlens 303. The light passing through the exit pupil 304 is incident on the unit pixel 100 using the optical axis 305 as the center. Pupil areas 306 and 307 are part of exit pupil areas of the imaging lens. As shown in FIG. 1, the light beam passing through the pupil area 306 is received by the photodiode 101A via the microlens 303. The light beam passing through the pupil area 307 is received by the photodiode 101B via the microlens 303. In this manner, since the photodiodes 101A and 101B respectively receive the light beams from the different pupil areas 306 and 307 of the exit pupil 304 of the imaging lens, focus detection based on the phase difference between the signals from the photodiodes 101A and 101B is possible.

Assume that the signal obtained from the photodiode 101A is an A image signal, and the signal obtained from the photodiode 101B is a B image signal. An (A+B) image signal obtained as the sum of the A and B image signals can be used as a captured image signal of the unit pixel 100.

Figure 2:
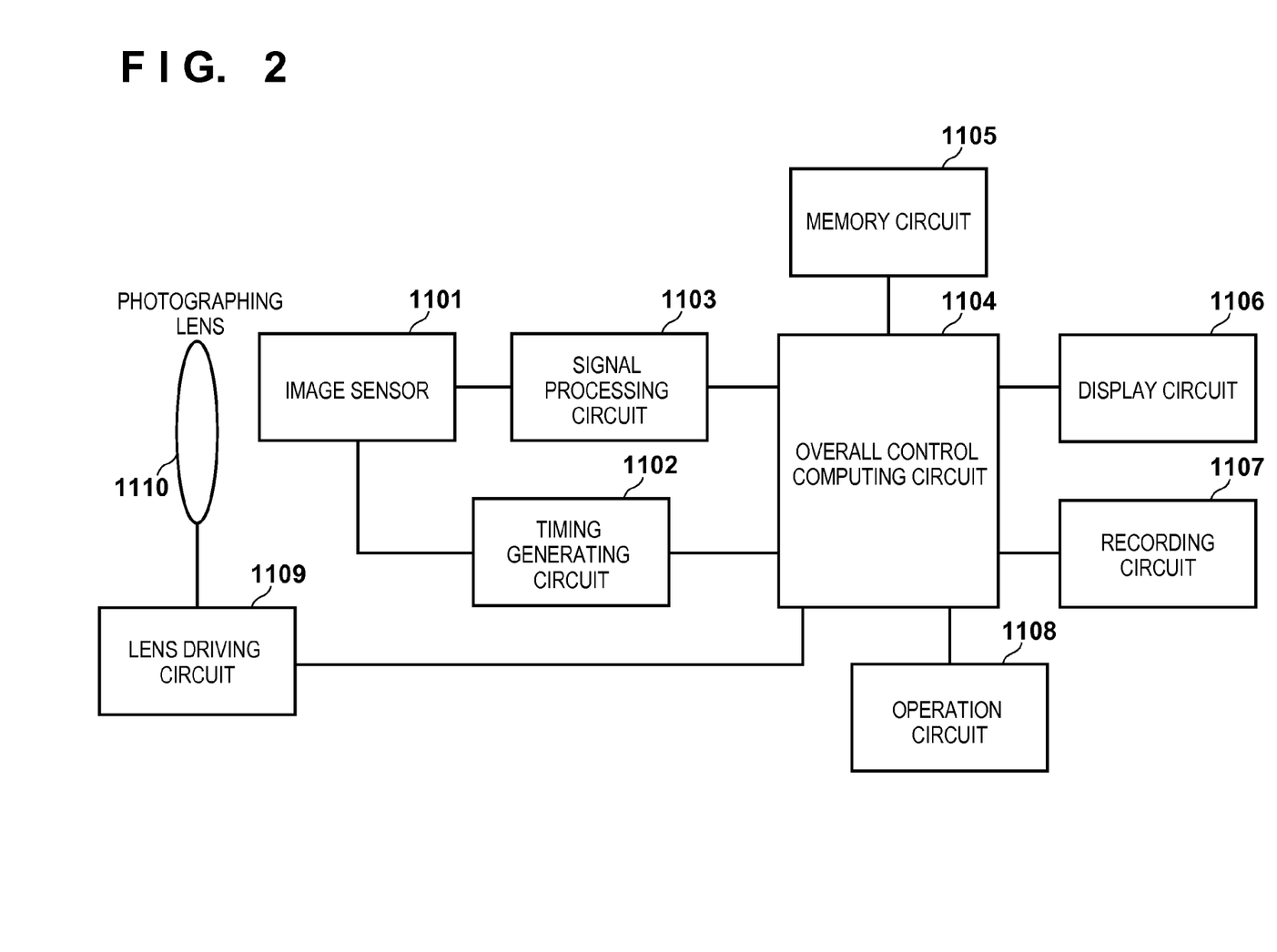
FIG. 2 is an overall block diagram of the image capturing apparatus.

FIG. 2 is a block diagram showing an example of the arrangement of the functions of the image capturing apparatus using the image sensor of this embodiment. The optical system of the image capturing apparatus includes an imaging lens 1110 for forming the optical image of an object on an image sensor 1101. A lens driving circuit 1109 performs zoom control, focus control, aperture control, and the like. The plurality of unit pixels 100 are arranged in a matrix on the image sensor 1101. An object image formed on the image sensor 1101 is output from the image sensor 1101 as an electrical image signal. A signal processing circuit 1103 performs various kinds of correction for the image signal output from the image sensor 1101 and compresses the image signal. The signal processing circuit 1103 may generate the B image signal as the difference signal between the A image signal and (A+B) image signal obtained by the image sensor 1101. A timing generating circuit 1102 outputs timing signals for driving the image sensor 1101. An overall control computing circuit 1104 performs various kinds of computation and controls the overall operation of the image capturing apparatus including the operation of the image sensor 1101. The overall control computing circuit 1104 also performs the focus detection operation of a phase difference detection method using the A and B image signals. The image data output from the signal processing circuit 1103 is temporarily stored in a memory circuit 1105. A display circuit 1106 displays various kinds of information and captured images. A recording circuit 1107 records or reads out image data. The recording circuit 1107 is a circuit for performs read and write accesses for a detachable recording medium such as a semiconductor memory. An operation circuit 1108 includes input devices represented by switches, buttons, and a touch panel. The operation circuit receives a user instruction to the image capturing apparatus.

Figure 3:
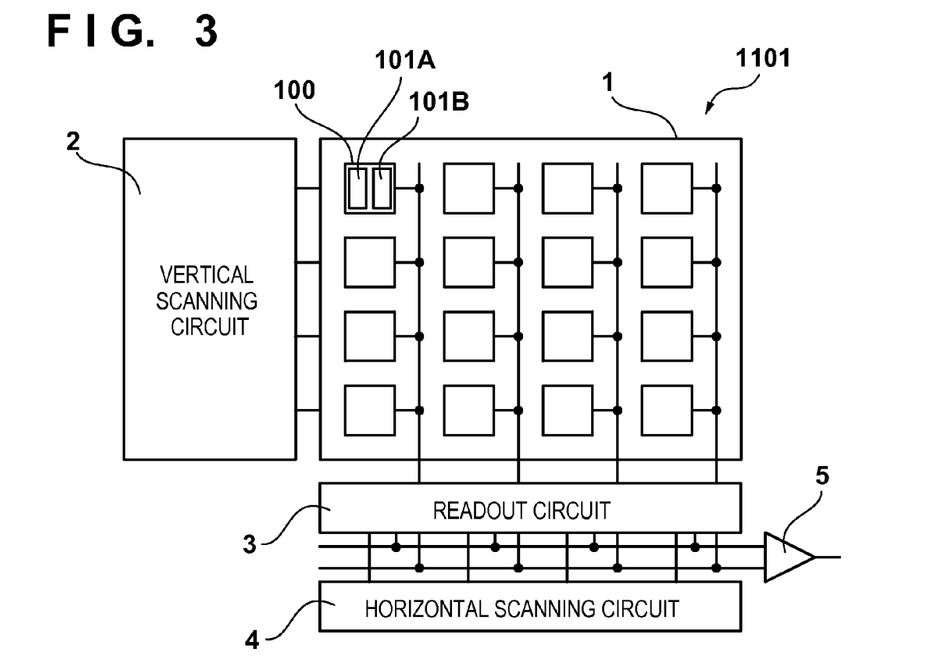
FIG. 3 is an overall view of an image sensor according to the first embodiment.

The arrangement example of the image sensor 1101 will be described with reference to FIGS. 3 to 5. FIG. 3 is a view showing the overall arrangement example of the image sensor 1101. The image sensor 1101 includes a pixel area 1, vertical scanning circuit 2, readout circuit 3, horizontal scanning circuit 4, and output amplifier 5. The plurality of unit pixels 100 are arranged in a matrix in the image area 1. For the descriptive convenience, an array of 16 (=4×4) unit pixels is illustrated. In practice, several million unit pixels are arranged in a matrix. As described with reference to FIG. 1, each unit pixel 100 includes the first photodiode 101A and the second photodiode 101B. In this embodiment, the vertical scanning circuit 2 selects each row of pixels of the pixel area 1 and sends a driving signal to the pixels of the selected row. The readout circuit 3 includes a column readout circuit for each column, amplifies the output signal from the unit pixel 100, and samples and holds the output signal. The horizontal scanning circuit 4 outputs a signal for sequentially outputting, to the output amplifier 5, signals sampled and held by the readout circuit 3. The output amplifier 5 outputs the signal from the readout circuit 3 to the signal processing circuit 1103 in accordance with the operation of the horizontal scanning circuit 4. The vertical scanning circuit 2, the readout circuit 3, and the horizontal scanning circuit 4 are driven by the timing signals from the timing generating circuit 1102.

Figure 4:
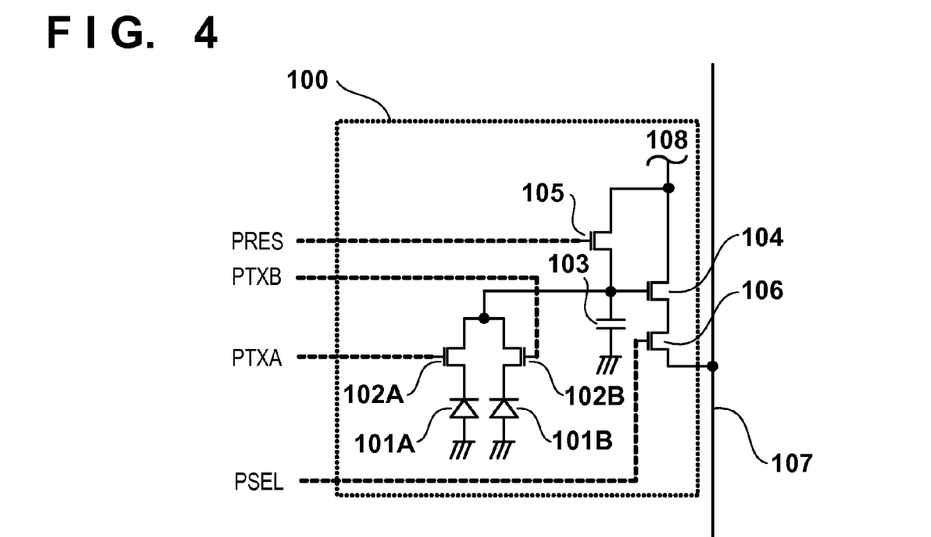
FIG. 4 is a circuit diagram of the unit pixel of the image sensor according to the first embodiment.

FIG. 4 is a circuit diagram showing the arrangement example of the unit pixel 100. A first transfer switch 102A and a second transfer switch 102B are connected to the first photodiode 101A and the second photodiode 101B, respectively. The outputs of the first and second transfer switches 102A and 102B are connected to an amplifier 104 via a floating diffusion region 103. A reset switch 105 is connected to the floating diffusion region 103, and a selection switch 106 is connected to the amplifier 104.

The photodiodes 101A and 101B function as photoelectric conversion units for receiving the light beams passing through the same microlens and generating signal charges corresponding to the received light amounts. The transfer switches 102A and 102B function as transfer units for transferring the charges generated by the photodiodes 101A and 101B to the common floating diffusion region 103. The transfer switches 102A and 102B are respectively controlled by transfer pulse signals PTXA and PTXB from the vertical scanning circuit 2. The floating diffusion region 103 functions as a charge-voltage converter for temporarily holding the charges transferred from the photodiodes 101A and 101B and converting the held charges into a voltage signal.

The amplifier 104 includes a source follower MOS transistor, amplifies the voltage signal converted by the floating diffusion region 103, and outputs the amplified signal as a pixel signal. The reset switch 105 is controlled by a reset pulse signal PRES from the vertical scanning circuit 2 and resets the potential of the floating diffusion region 103 to a reference potential VDD 108. The selection switch 106 is controlled by a vertical selection pulse signal PSEL from the vertical scanning circuit 2 and outputs the voltage signal amplified by the amplifier 104 as the pixel signal to a vertical output line 107.

Figure 5:
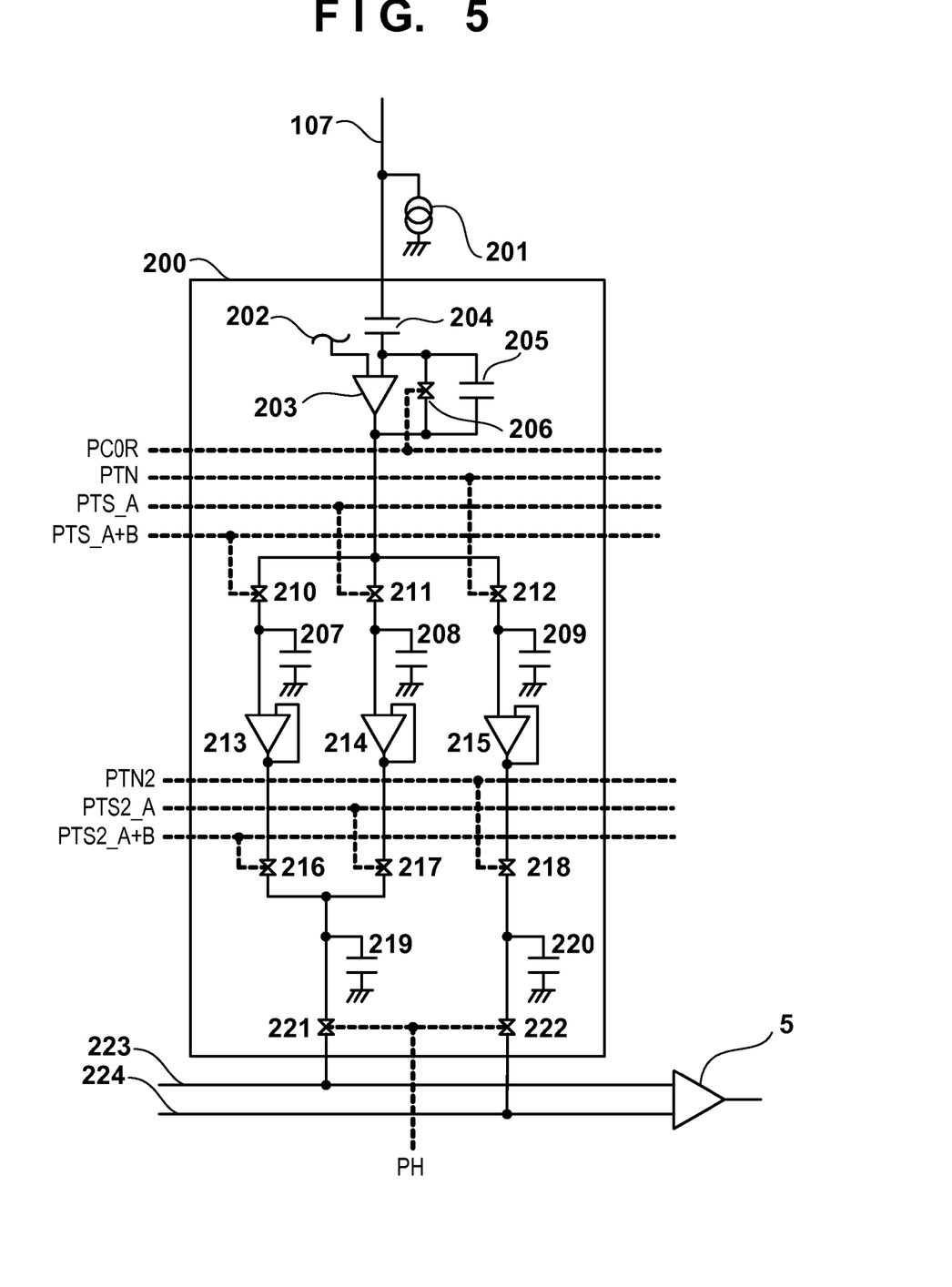
FIG. 5 is a circuit diagram showing a readout circuit of the image sensor according to the first embodiment.

FIG. 5 is a circuit diagram showing the arrangement example of a column readout circuit 200 included in the readout circuit 3 in FIG. 3. The readout circuit 3 includes the column readout circuit 200 for each column, and the arrangements of the respective columns are common to each other. Only one column is illustrated. An operation amplifier 203 amplifies the signal voltage on the vertical output line 107. The operational amplifier 203 receives a reference voltage VREF. A clamp capacitor C0204 is connected to the input of the operational amplifier 203, and a feedback capacitor Cf205 is connected to the input and output of the operational amplifier 203. A switch 206 for short-circuiting the two terminals of the feedback capacitor Cf205 is connected to the two terminals of the feedback capacitor Cf205. The switch 206 is controlled by a PC0R signal from the readout circuit 3. A constant current source 201 is connected to the vertical output line 107.

A CTS_A+B 207, CTS_A 208, and CTN 209 are capacitors for holding the signal voltage from the operational amplifier 203. Switches 210, 211, and 212 are switches to control write to the CTS_A+B 207, CTS_A 208, and CTN 209, respectively. The switch 210 is controlled by the PTS_A+B signal from the readout circuit 3; the switch 211, by the PTS_A signal from the readout circuit 3; and the switch 212, by the PTN signal from the readout circuit 3. A $CTS_2$ 219 and $CTN_2$ 220 are capacitors for holding the signal voltages from the CTS_A+B 207, CTS_A 208, and CTN 209. Switches 216, 217, and 218 control write to the $CTS_2$ 219 and $CTN_2$ 220. The switch 216 writes the signal of the CTS_A+B 207 in the $CTS_2$ 219 and is controlled by a PTS2_A+B signal from the readout circuit 3. The switch 217 writes the signal of the CTS_A 208 in the $CTS_2$ 219 and is controlled by a PTS2_A signal from the readout circuit 3. The switch 218 writes the signal of the CTN 209 in the $CTN_2$ 220 and is controlled by a PTN2 signal from the readout circuit 3.

Voltage follower circuits 213, 214, and 215 serving as buffers are arranged immediately before the $CTS_2$ 219 and $CTN_2$ 220. The voltage follower circuits 213, 214, and 215 transfer potentials equal to the potentials accumulated in the CTS_A+B 207, CTS_A 208, and CTN 209 to the $CTS_2$ 219 and $CTN_2$ 220 without capacitive division.

A switch (not shown) for short-circuiting the two terminals of each capacitor as in the feedback capacitor Cf 205 is arranged for each of the CTS_A+B 207, CTS_A 208, CTN 209, $CTS_2$ 219, and $CTN_2$ 220. By turning on each switch for each readout operation for each row, the CTS_A+B 207, CTS_A 208, CTN 209, $CTS_2$ 219, and $CTN_2$ 220 are reset.

Switches 221 and 222 are controlled by a PH signal from the horizontal scanning circuit 4. The signal written in the $CTS_2$ 219 is output to the output amplifier 5 via a common output line 223. The signal written in the $CTN_2$ 220 is output to the output amplifier 5 via the common output line 224. The write operation of signals to the CTS_A+B 207, CTS_A 208, and CTN 209 and the signal readout operation from the CTS$_2$ 219 and CTN$_2$ 220 by horizontal scanning are performed parallel.

Figure 6:
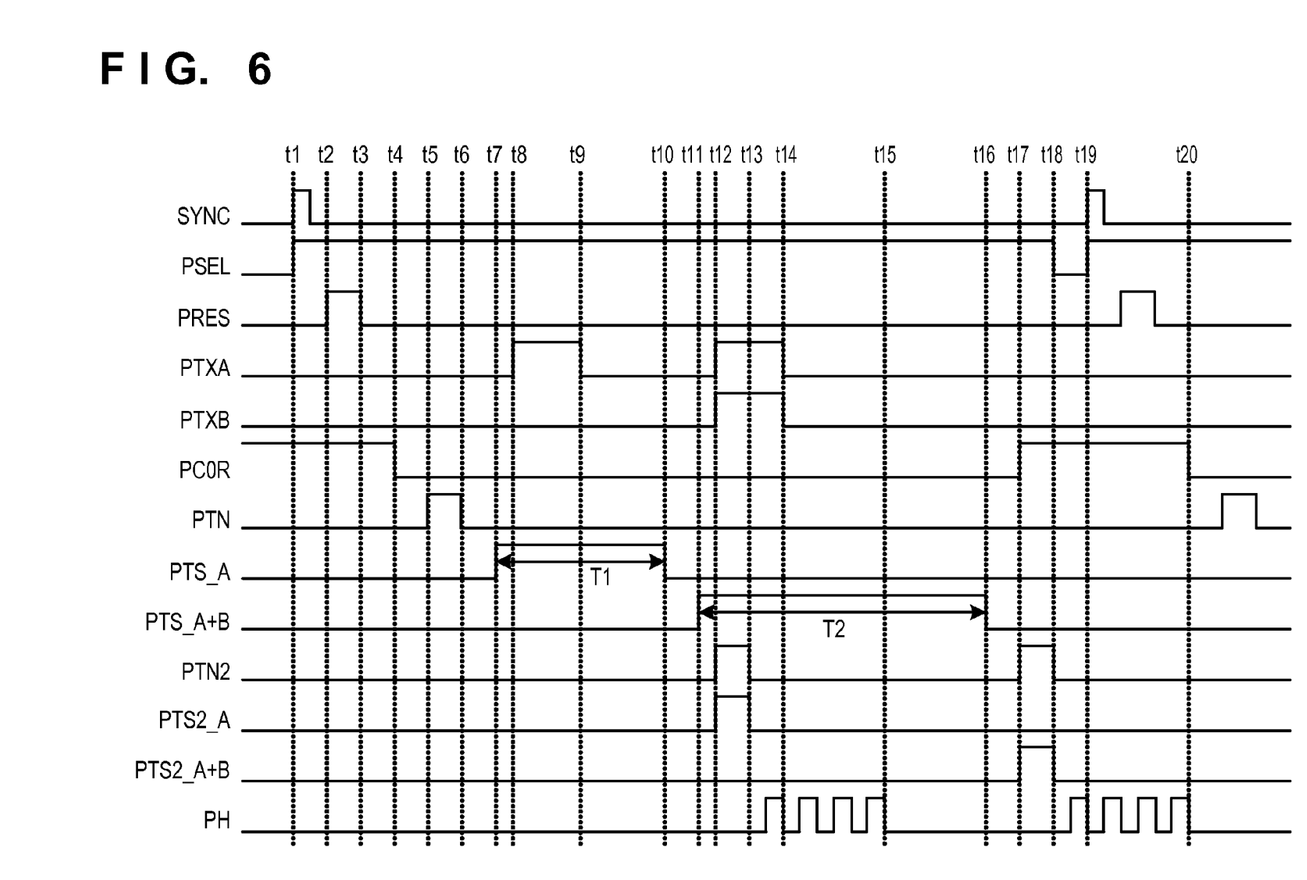
FIG. 6 is a driving timing chart of the image sensor according to the first embodiment.

FIG. 6 is a timing chart for implementing the method of driving the image sensor 1101 according to this embodiment. FIG. 6 shows the driving timings when the vertical scanning circuit 2 selects a given row. At time t1, a horizontal synchronization signal SYNC rises, and at the same time, the vertical selection pulse signal PSEL of the selected row changes from L level to H level. This makes it possible to turn on the selection switch 106 (FIG. 4) of the selected row and outputs the pixel signal of the selected row to the vertical output line 107.

At time t2, the reset pulse signal PRES changes from L level to H level to turn on the reset switch 105 and reset the potential of the floating diffusion region 103 to the power supply voltage VDD. At time t3, the reset pulse signal PRES changes from H level to L level to turn off the reset switch 105 and cancel the reset state of the floating diffusion region 103. At this time, the potential of the floating diffusion region 103 is read out as a reset signal level to the vertical output line 107 via the amplifier 104 and input to the column readout circuit 200. In the column readout circuit 200, the switch 206 (FIG. 5) is set ON because the PC0R signal is set at H level. The reset signal level is input to the clamp capacitor C0204 in a state in which the operational amplifier 203 buffers the output of the reference voltage VREF.

At time t4, the PC0R signal then changes from H level to L level. At time t5, the PTN signal changes to H level to turn on the switch 212. The output from the operational amplifier 203 at this time is written in the capacitor CTN 209 as the reset voltage. Thereafter, at time t6, the PTN signal changes to L level to turn off the switch 212, there by completing the write operation of the reset voltage to the CTN 209.

At time t7, the PTS_A signal is set at H level to turn on the switch 211, thereby setting a state in which the signal can be written in the capacitor CTS_A 208. Subsequently, at time t8, the transfer pulse signal PTXA is set at H level to transfer the charges of the photodiode 101A to the floating diffusion region 103. At time t9, the transfer pulse signal PTXA is set at L level. This operation makes it possible to read out the charges accumulated in the photodiode 101A to the floating diffusion region 103. The floating diffusion region 103 converts the charges into a voltage. The voltage is supplied to the column readout circuit 200 via the amplifier 104 and the vertical output line 107.

In the column readout circuit 200, the operational amplifier 203 amplifies the voltage from the vertical output line 107 at a gain corresponding to a ratio of the capacitances of the clamp capacitor C0204 and the feedback capacitor Cf205 and outputs the amplified voltage. The signal voltage supplied from the photodiode 101A is written in the capacitor CTS_A 208. At time t10, the PTS_A signal changes from H level to L level to turn off the switch 211, thereby completing the write operation in the capacitor CTS_A 208. A signal write period (time t7 to time t10) to the capacitor CTS_A 208 is defined as T1.

At time t11, the PTS_A+B signal is set at H level to turn on the switch 210, thereby setting a state in which a signal can be written in the capacitor CTS_A+B 207. Subsequently, at time t12, the transfer pulse signal PTXA is set at H level again, and at the same time the transfer pulse signal PTXB is also set at H level. This operation makes it possible to simultaneously read out the charges of both the photodiodes 101A and 101B to the floating diffusion region 103. At time t14, the transfer pulse signals PTXA and PTXB are then set at L level. The readout charges are converted into a voltage which is then supplied to the column readout circuit 200. The converted voltage is then amplified by the operational amplifier 203. The signal amplified by the operational amplifier 203 is written in the capacitor CTS_A+B 207. At time t16, the PTS_A+B signal changes from H level to L level to turn off the switch 207, thereby completing the write operation in the capacitor CTS_A+B 207. The signal write period for the capacitor CTS_A+B 207, that is, time t11 to time t16, is defined as T2.

Note that at time t12, the transfer pulse signals PTXA and PTXB are simultaneously set at H level. However, only the transfer pulse signal PTXB may be set at H level, and the charges of the photodiode 101B may be transferred to the floating diffusion region 103. In this case, since the charges of the photodiode 101A have already been transferred to the floating diffusion region 103, an output as the sum of the charges of the photodiodes 101A and 101B can be obtained. With the above operation, the signal write operations for the capacitors CTS 209, CTS_A 208, and CTS_A+B 207 are completed.

The (A+B) image signal as the sum of the output signals from the photodiodes 101A and 101B can be obtained from the difference between the signals held in the capacitors CTS_A+B 207 and CTN 209. This (A+B) image signal serves as an image signal. In addition, the A image signal as the output signal from the photodiode 101A is obtained from the difference between the signals held in the capacitors CTS_A 208 and CTN 209. Information of the light beam passing through part of the pupil of the imaging lens is obtained from the A image signal, and the A signal is subtracted from the (A+B) image signal to obtain the difference, thereby obtaining the B image signal as the output signal from the photodiode 101B. Information of a light beam passing through a pupil area different from that of the image signal can be obtained from the B image signal. Therefore, focus information and distance information can be obtained from the pieces of information of the two light beams represented by the A and B image signals.

It takes a relatively long time to write the signals of the pixel unit in the capacitors CTS_A 208 and CTS_A+B 207 in consideration of the transmission delay on the vertical output line and the stabilization period of the operational amplifier 203. When the stabilization period is short, fixed pattern noise such as shading occurs on the signal. There exists a strong demand of reducing the fixed pattern noise in the captured image signal ((A+B) image signal) as compared with the focus detection signals (A and B image signals). In other words, the fixed pattern noise need not be reduced in the focus detection signals as compared with the captured image signal. In this embodiment, a signal to be written in the capacitor CTS_A 208 is used for focus detection, and a signal to be written in the capacitor CTS_A+B 207 is used for the captured image. The A image signal for focus detection has a voltage lower than that of the (A+B) image signal for the captured image. For this reason, the write period T1 for writing a signal in the capacitor CTS_A 208 for the A image signal as the focus detection signal is set shorter than the write period T2 for writing a signal in the capacitor CTS_A+B 207 for the (A+B) image signal as the captured image signal. For example, the A signal write period T1 is set as 5.8 μsec, and the A+B signal write period T2 is set as 6.3 μsec. That is, the A signal write period T1 is set shorter than the A+B signal write period T2 by 0.5 μsec. This makes it possible to shorten the readout time while suppressing the noise of the captured image.

In order to write the signal in the capacitor CTS_A 208, the timing (time t7) at which the PTS_A signal is set at H level is set earlier than the timing at which the transfer pulse signal PTXA is set at H level in this embodiment, but may be later than that. In this case, the write period T1 for the capacitor CTS_A 208 may be defined as a period until the PTS_A signal is set at L level (time t10) after the transfer pulse single PTXA is set at H level (time t8). Similarly, in order to write a signal in the capacitor CTS_A+B 207, the timing (time t11) at which the PTS_A+B signal is set at H level may be set later than the timing (time t12) at which the transfer pulse signals PTXA and PTXB are set at H level. In this case, the write period T2 for the capacitor CTS_A+B 207 may be defined as a period until the PTS_A+B signal is set at L level (time t16) after the transfer pulse signals PTXA and PTXB are set at H level (time t12).

Referring back to FIG. 6, at time t17, the PC0R signal is set at H level again to turn on the switch 206. In the column readout circuit 200, the state returns to a state in which the operational amplifier 203 buffers the output of the reference voltage VREF. At time t18, the vertical selection pulse signal PSEL is set at L level to complete the signal readout operation from the pixels of the selected row. The selected row is disconnected from the vertical output line. Thereafter, at time t19, the horizontal synchronization signal SYNC set at H level again and the vertical selection pulse signal PSEL of the next row is set at H level, thereby starting selection of the pixels of the next row.

The time returns to time t12. At time t12, the (A+B) image signal is written in the capacitor CTS_A+B 207, and at the same time, the PTS2_A signal and PTN2 signal change from L level to H level, thereby turning on the switches 217 and 218. The signal held in the capacitor CTN 209 is written in the capacitor $CTN_2$ 220 via the voltage follower circuit 215, and the signal held in the capacitor CTS_A 208 is written in the capacitor $CTS_2$ 219 via the voltage follower circuit 214. At time t13, the PINS signal and the PTS2_A+B signal simultaneously change from H level to L level, thereby completing the write operations in the capacitors $CTN_2$ 220 and $CTS_2$ 219.

Thereafter, a period between time t13 and time t15, the driving pulse PH of the horizontal scanning circuit 4 sequentially changes in an order of L level, H level, and L level for each readout circuit of each column. Along with this, the switches 221 and 222 are turned off, on, and off for each column, thereby performing horizontal scanning. The signals held in the capacitors $CTS_2$ 219 and $CTN_2$ 220 of each column when the switches 221 and 222 are turned off, on, and off for each column are read out to the common output lines 223 and 224. The output amplifier 221 outputs the signals as the difference voltage of the signals from the common output lines 223 and 224. The difference voltage is the A image signal. Note that the common output lines 223 and 224 are reset to the reference potential by a reset switch (not shown) every time the signals of each column are read out.

In this case, horizontal scanning of the A image signal is performed during (period T2) the write operation of the (A+B) image signal in the capacitor CTS_A+B 207. This horizontal scanning period is completed until time t16 of completing write operation in the capacitor CTS_A+B 207. After the end of the write operation of the (A+B) signal in the capacitor CTS_A+B 207, write operation and horizontal scanning of the (A+B) image signal in the capacitor $CTS_2$ 219 are performed. These operations are performed parallelly with the resetting of the floating diffusion region 103 for the next row and write operations in the capacitors CTN 209 and CTS_A 208. At time t17, the PTN2 and PTS2_A+B signals simultaneously change from L level to H level to turn on the switches 216 and 218. The signal held in the capacitor CTN 209 is written in the capacitor $CTN_2$ 220 via the voltage follower circuit 215. In addition, the signal held in the capacitor CTS_A+B 207 is written in the capacitor $CTS_2$ 219 via the voltage follower circuit 213. At time t18, the PTN2 and PTS2_A+B signals simultaneously change from H level to L level to complete the write operation.

The driving pulse PH of the horizontal scanning circuit 4 sequentially changes in an order of L level, H level, and L level during a period of time t18 to t20 to perform horizontal scanning of the signals held in the capacitors $CTN_2$ 220 and $CTS_2$ 219 in the example of FIG. 6. The switches 221 and 222 of each column are driven by the driving pulse PH in an order of OFF, ON, and OFF. The signals held in the capacitors $CTS_2$ 219 and $CTN_2$ 220 are read out to the common output lines 223 and 224 by the switches 221 and 222. The output amplifier 221 outputs readout signals as the difference voltage between signals of the common output lines 223 and 224. This difference voltage is the (A+B) image signal.

The horizontal scanning of the (A+B) image signal is performed parallelly with resetting of the floating diffusion region 103 for the next row and write in the capacitors CTN 209 and CTS_A 208. The parallel processing can shorten the processing time. The horizontal scanning period can be completed until the next time t10 at which write in the capacitor CTS_A 208 for the next row ends.

As described above, according to this embodiment, the time required to write the focus detection signal in the capacitor is made shorter than the time required for writing the captured signal in the capacitor, thereby shorting the time required for one-frame read access without adversely affecting the captured signal.

This embodiment employs an arrangement including the two photodiodes in the unit pixel. The number of photodiodes in the unit pixel is not limited to two and can suffice if a plurality of photodiodes are used. For example, four photodiodes may be arranged in the unit pixel. Signals of two photoelectric conversion units in the unit pixel may be read out for focus detection, and the signals of all the photoelectric conversion units in the unit pixel may be read out for image capturing.

Second Embodiment

An example of applying an image sensor of the present invention to an image capturing apparatus will be described with reference to the circuit block of FIG. 2. A signal from an overall control computing circuit 1104 is supplied to a timing generating circuit 1102 in accordance with an operation from an operation circuit 1108. An object image is formed on an image sensor 1101 by an imaging lens 1110 and aperture of an optical system. The timing generating circuit 1102 supplies timing signals to the image sensor to control it. The object image formed on the image sensor is converted into an electrical signal by the image sensor, and the electrical signal is output from the image sensor 1101. Note that although the image sensor 1101 can have a function of converting an analog signal formed on the image sensor into a digital single, but a signal processing circuit 1103 may perform this conversion. The image processing circuit 1103 corrects and compresses an output signal from the image sensor 1101. The processed image signal is temporarily stored in a memory circuit 1105 under the control of the overall control and computing circuit 1104 or displayed on a display circuit 1106 in accordance with an operation from the operation circuit 1108. The overall control computing circuit 1104 transfers the image signal from the signal processing circuit 1103 to a recording circuit 1107 and stores it in the recording circuit 1107. The recording circuit 1107 can be a detachable semiconductor memory.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093051, filed Apr. 25, 2013, which is hereby incorporated by reference herein in its entirety.

What is claimed is:

1. An image capturing apparatus comprising:
a plurality of pixels each including a plurality of photoelectric conversion portions;
a holding portion which holds signals output from the plurality of pixels;
a driver which performs a first holding process for holding first signals supplied from a first number of photoelectric conversion portions of each pixel in the holding portion and a second holding process for holding second signals supplied from a second number of photoelectric conversion portions of each pixel in the holding portion, wherein a period of the first holding process is set shorter than a period of the second holding process, and the second number being larger than the first number;
a signal processor which performs a predetermined process on the second signals and generate a captured image data;
a memory which stores the captured image data; and
a display unit which displays the captured image data,
wherein the second signal is used for generating the captured image data in the signal processor, and the first signal and a difference signal between the second signal and the first signal are used for focus detection.

2. The apparatus according to claim 1, wherein each of the plurality of pixels includes a charge-voltage conversion portion shared by the plurality of photoelectric conversion portions and a transfer portion which transfers charges generated by the plurality of photoelectric conversion portions to the charge-voltage conversion portion.

3. The apparatus according to claim 1, wherein each of the plurality of pixels includes one microlens.

4. The apparatus according to claim 1, wherein each of the plurality of pixels includes two photoelectric conversion portions, the first signal is a signal supplied from one photoelectric conversion portion of the pixel, and the second signal is a signal obtained by mixing signals supplied from the two photoelectric conversion portions.

5. The apparatus according to claim 1, further comprising an imaging lens which forms an optical image of an object on the plurality of pixels.

6. A method of controlling an image capturing apparatus including a plurality of pixels each including a plurality of photoelectric conversion portions, a holding portion which holds signals output from the plurality of pixels, a driver which performs a first holding process for holding first signals supplied from a first number of photoelectric conversion portions of each pixel in the holding portion and a second holding process for holding second signals supplied from a second number of photoelectric conversion portions of each pixel in the holding portion, wherein a period of the first holding process is set shorter than a period of the second holding process, and the second number being larger than the first number, a signal processor which performs a predetermined process on the second signals and generate a captured image data, a memory which stores the captured image data, and a display unit which displays the captured image data, the method comprising:
generating the captured image data from the second signals in the signal processor, and
detecting focus using the first signal and a difference signal between the second signal and the first signal.

7. The method according to claim 6, wherein each of the plurality of pixels includes a charge-voltage portion shared by the plurality of photoelectric conversion portions and a transfer portion which transfers charges generated by the plurality of photoelectric conversion portions to the charge-voltage portion.

8. The method according to claim 6, wherein each of the plurality of pixels includes one microlens.

9. The method according to claim 6, wherein each of the plurality of pixels includes two photoelectric conversion portions, the first signal is a signal supplied from one photoelectric conversion portion of the pixel, and the second signal is a signal obtained by mixing signals supplied from the two photoelectric conversion portions.

10. The method according to claim 6, wherein the image capturing apparatus further comprising an imaging lens which forms an optical image of an object on the plurality of pixels.

11. An image capturing apparatus comprising:
a plurality of pixels each including a plurality of photoelectric conversion portions;
a driver which performs a first readout process for reading out first signals from a part of the photoelectric conversion portions of each pixel and a second readout process for reading out second signals from all photoelectric conversion portions of each pixel, wherein the first signals and difference signals between the second signals and the first signals are used for focus detection;
a signal processor which generates a captured image data from the second signals; and
a controller which controls the driver and the signal processor, wherein a period of the first readout process is set shorter than a period of the second readout process.

12. The apparatus according to claim 11, further comprising a memory which stores the captured image data.

13. The apparatus according to claim 11, further comprising a display unit which displays the captured image data.

14. The apparatus according to claim 11, wherein each of the plurality of pixels includes a charge-voltage conversion portion shared by the plurality of photoelectric conversion portions and transfer portions which transfers charges generated by the plurality of photoelectric conversion portions to the charge-voltage conversion portion.

15. The apparatus according to claim 11, wherein each of the plurality of pixels includes one microlens.

16. The apparatus according to claim 11, wherein the second signals are obtained by combining signals from all photoelectric conversion portions of each pixel.

17. The apparatus according to claim 11, further comprising an imaging lens which forms an optical image of an object on the plurality of pixels.

18. An image capturing apparatus comprising:
a plurality of pixels each including a plurality of photoelectric conversion portions;
a driver which performs a first readout process for reading out a first signal from each pixel after a first charge accumulation process and a second readout process for reading out a second signal from each pixel after a second charge accumulation process, wherein the first signal and a difference signal between the second signal and the first signal are used for focus detection and the second signal is used for generating a captured image data;
a signal processor which generates the captured image data from the second signal; and
a controller which controls the driver and the signal processor,
wherein a period of the first readout process is set shorter than a period of the second readout process.

19. The apparatus according to claim 18, further comprising a memory which stores the captured image data.

20. The apparatus according to claim 18, further comprising a display unit which displays the captured image data.

21. The apparatus according to claim 18, wherein each of the plurality of pixels includes a charge-voltage conversion portion shared by the plurality of photoelectric conversion portions and transfer portions which transfer charges generated by the plurality of photoelectric conversion portions to the charge-voltage conversion portion.

22. The apparatus according to claim 18, wherein each of the plurality of pixels includes one microlens.

23. The apparatus according to claim 18, wherein the second signal is obtained by combining signals from all photoelectric conversion portions of each pixel.

24. The apparatus according to claim 18, further comprising an imaging lens which forms an optical image of an object on the plurality of pixels.

25. A method of controlling an image capturing apparatus including a plurality of pixels each including a plurality of photoelectric conversion portions, the method comprising:
performing a first readout process for reading out first signals from a part of the photoelectric conversion portions of each pixel and a second readout process for reading out second signals from all photoelectric conversion portions of each pixel, wherein the first signals and difference signals between the second signals and the first signals are used for focus detection, and
generating a captured image data from the second signals,
wherein a period of the first readout process is set shorter than a period of the second readout process.

26. The method according to claim 25, further comprising storing the captured image data.

27. The method according to claim 25, further comprising displaying the captured image data.

28. A method of controlling an image capturing apparatus including a plurality of pixels each including a plurality of photoelectric conversion portions, the method comprising:
performing a first readout process for reading out a first signal from each pixel after a first charge accumulation process and a second readout process for reading out a second signal from each pixel after a second charge accumulation process, wherein the first signal and a difference signal between the second signal and the first signal are used for focus detection and the second signal is used for generating a captured image data; and
generating the captured image data from the second signal,
wherein a period of the first readout process is set shorter than a period of the second readout process.

29. The method according to claim 28, further comprising storing the captured image data.

30. The method according to claim 28, further comprising displaying the captured image data.

* * * * *